March 1, 1960  F. K. MUELLER ET AL  2,926,530
AUTOMATIC CONTROL SYSTEM FOR A PIVOTED PLATFORM
Filed April 15, 1958  4 Sheets-Sheet 1

INVENTORS:
FRITZ K. MUELLER
AND
ROBERT C. MARTIN
BY

March 1, 1960  F. K. MUELLER ET AL  2,926,530
AUTOMATIC CONTROL SYSTEM FOR A PIVOTED PLATFORM
Filed April 15, 1958  4 Sheets-Sheet 4

INVENTORS:
FRITZ K. MUELLER
AND
ROBERT C. MARTIN
BY W. E. Thibodeau,
Victor L. Billings and
Alvin E. Moore, United States Patent Office 2,926,530
Patented Mar. 1, 1960

2,926,530

AUTOMATIC CONTROL SYSTEM FOR A PIVOTED PLATFORM

Fritz K. Mueller and Robert C. Martin, Huntsville, Ala.

Application April 15, 1958, Serial No. 728,756

11 Claims. (Cl. 74—5.47)

(Granted under Title 35, U.S. Code (1952), sec. 266)

The invention described herein may be manufactured and used by or for the Government for governmental purposes without payment of any royalties thereon.

This invention relates to an automatic control system for a pivoted platform in a moving craft. Such a stabilized platform provides a datum line or plane for the level support, or for the support in any predetermined plane, of various instruments, including, in aircraft or guided missiles: compasses; pitch or rate-of-pitch detectors; angle-of-turn and rate-of-turn instruments; roll detectors; bomb sights; cameras; stabilized antennas; telescopes; stabilized inertial guidance instruments. When a datum line on the stabilized platform begins to depart from its level or horizontal position, due to change in the attitude of the moving craft, a level or plumbline indicating device on the platform produces and transmits a signal, which may be hydraulic but is preferably electrical. This signal controls electric circuits, thus operating a servo motor which returns the platform datum line to a level or horizontal position. A pair of such platform datum lines and control systems may be utilized in cooperation to maintain a datum plane of the stabilized platform in a level position and to maintain an instrument-supporting portion of the platform in any predetermined plane.

One of the most difficult problems in making a highly sensitive stabilized platform is inherent in the tendency of the automatic control systems to hunt. Between the time that the level indicating device functions to signal that the platform has departed from or returned to its predetermined position and the time that the servo motor moves the platform to restore said position, there is a lag, so that after the level indicating device has moved back to its middle or zero position the servo motor briefly continues to operate, this over-correcting the deviation of the platform, placing it out of position in the opposite direction, and necessitating a counter-correction, with its own retardation. Such hunting of the controls and resulting inaccuracy of the instruments must be reduced to a slight extent if any guided missile, that, for example, supports an inertial-guidance stabilized platform, is to be accurately controlled.

In an automatic electric control system that comprises such a stabilized platform, a primary source of the hunting error lies in the level or plumbline sensing device. Conventional indicating devices of this type comprise a pendulum that is pivoted in bearings that impose a couple, due to friction, on the axis of the pendulum. This friction reduces the sensitivity of the pendulum. Moreover, the inertia of the pendulum causes it to swing beyond its plumbline, with consequent oscillation and hunting of any automatic system controlled by the pendulum. To reduce this oscillation, inventors have added to the pendulum means for damping its movement. But such known damping means have not sufficiently reduced pendulum oscillations, and have not at all reduced that part of the hunting of an associated control system which is due to friction on the pendulum's bearings.

An object of this invention is to provide an automatic, platform-stabilizing control system in which hunting of the servo motor is reduced to a minimum.

Another object of the invention is to provide a stabilized platform and associated automatic controls which may be used for the level or other predetermined support of precision or other highly sensitive instruments on various moving land and sea craft, such as television or motion picture camera trucks, contour-plowing tractors and ships, or on aircraft or guided missiles.

Another object of the invention is to provide such a stabilized platform and control system which comprises a level indicating device having novel means for efficient reduction of hunting of the controls.

Another object is to provide a stabilized platform that is pivoted on a single axis, is highly sensitive to changes of position relative to the axis, and is quickly restored to its predetermined position after departure therefrom.

A further object of the invention is to provide, in combination, a stabilized platform that is pivoted on a plurality of axes, anti-hunting, level indicating mechanism that is sensitive to movement about each axis, and an automatically controlled motor for restoration of the platform to its level position relative to each axis.

The foregoing and other objects of this invention will become more fully apparent from the following detailed description of an embodiment of the invention and from the accompanying drawings, in which.

Figure 3:
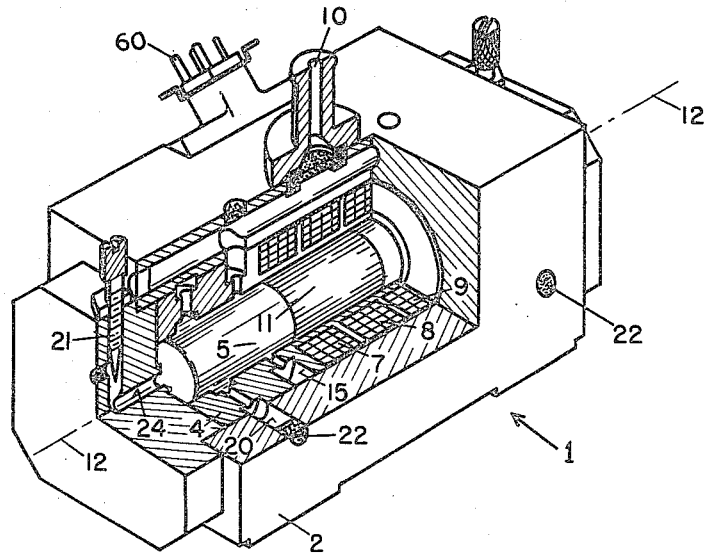
Figure 3 is a perspective view of a level and plumbline sensing and anti-hunting device that is a part of the control system.
Figure 4:
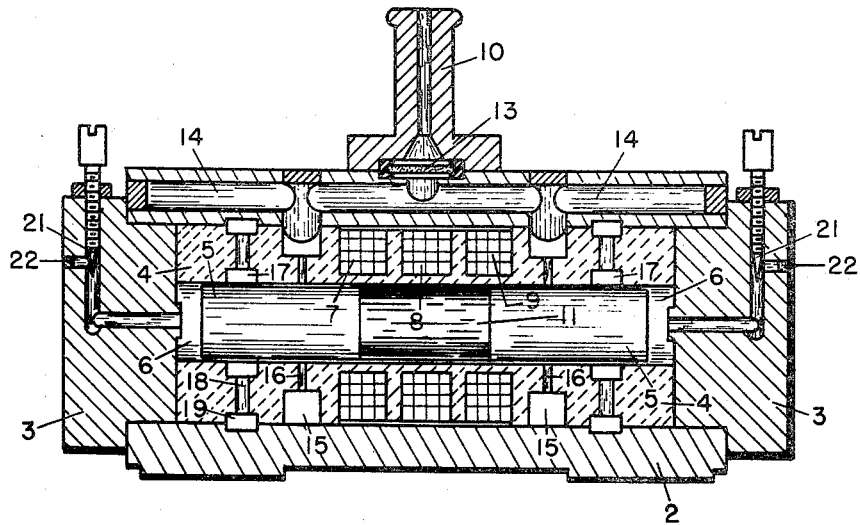
Figure 4 is an elevational view in axial section of the device of Figure 3.

The level-indicating and anti-hunting device, which is a key element in the control system of each of the disclosed embodiments, is shown in Figures 3 and 4. This device comprises: a casing 1, consisting of an apertured, symmetrical frame 2 and end caps 3 fitted into the ends of the aperture; an apertured core sleeve 4; a differential transformer having coils 7, 8 and 9; a reciprocable element or piston 5, mounted, with a clearance, in said core sleeve 4; and means 10 for the supply of compressed air to the air bearing between elements 4 and 5. At each end of the reciprocable element there is a large clearance, or chamber, 6, which during operation becomes filled with air and serves for damping the movement of piston 5, and thus for elimination of hunting in the automatic control system, and, when the device is used in an automatic control system, eliminates hunting of the controls.

Core sleeve 4 is made of an electrically insulating material, and is preferably of vitreous ceramic or like material. One material that may be used is composed of magnesium oxide and silicon dioxide; another is composed of zirconium dioxide and silicon dioxide. At its middle portion sleeve 4 is externally and annularly recessed for housing the three coils 7, 8 and 9 of the differential transformer.

Piston or cylinder 5 is made of ceramic or other electrically insulating material, preferably of one of the specific compositions set forth above. This piston, which is the equivalent of a pendulum, has a middle portion 11 that has a surface of magnetic material, such as iron. The magnetic core coacts with the transformer coils to produce an electrical signal that is transmitted via connections 60 when the piston shifts from its median position, and to produce no signal, or a signal of zero value, when the piston axis (datum line) 12 is in a horizontal plane.

In order to make the cylinder or quasi pendulum 5 highly sensitive to changes in the level of the device a novel air bearing is provided. Compressed air or, alternatively, other gas from a reservoir or compressor is supplied to the level-indicating device from fitting 10, preferably through a filter 13, to passages 14, 15, and 16, to form an air bearing between sleeve 4 and piston 5. From this air bearing, that is, from each end portion of piston 5, the air is conducted through passages 18, 19 and 20 either to the atmosphere, optionally through filter 22, or to the inlet of the compressor. Annular passage 17 are axially spaced from the ends of sleeve 4 by an amount equal to or slightly greater than the sum of the axial dimensions of the two air chambers 6, so that in any position of the cylinder 5 there are restrictions in the air-flow paths between passages 17 and both of the end chambers 6.

Air flow from the chambers 6 to the atmosphere (or the compressor inlet) is controlled by means of the adjustable valves 21. In use, these valves may be adjusted to provide a restricted flow of air from chamber 6; or one or both of said valves may be closed completely to shut off the flow of air via one or both of filters 22. Alternatively, the valves and the end-plate passages controlled by the valves may be eliminated.

Figure 5:
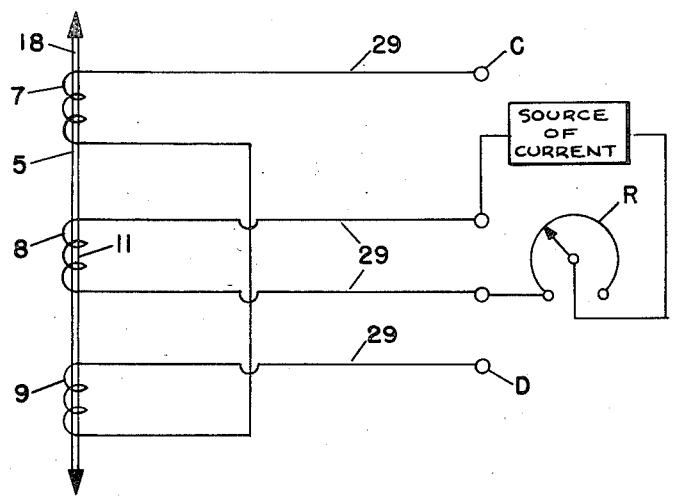
Figure 5 is a diagram indicating the differential transformer and its immediately adjacent electrical conductors.

With reference to the schematic showing of the differential transformer in Figure 5, a constant input voltage, which may be adjusted, is applied from a battery or other source of electric current to the middle coil 8. As long as a piston or cylinder 5, schematically shown in Figure 5, is centered within the transformer coils equal magnetic flux surrounds coils 7 and 9. Since these coils are connected in series opposition, any net output voltage thus is zero when the datum line of the device is level. But when cylinder 5 shifts from its median position its magnetic middle portion causes a change in the flux distribution in the transformer, so that unequal voltages are induced in the two end coils, resulting in an output or signal voltage that is proportional to the movement and/or rate of movement of the cylinder, depending upon whether the source of current is alternating current or direct current. If the source is alternating current both signal components will be produced and if direct current only, the rate-of-movement component will appear. This signal voltage is conducted from terminals C and D to a level or plumbline indicating dial or pointer or, alternatively, to circuits of an automatic control system for restoration of the device 1 and its support to a level position.

The movement of cylinder 5 is resisted and hunting within the automatic control system is substantially reduced, by two forces that increase as the cylinder moves farther from its median position. One of these increasing forces is the reaction force that is exerted on the magnetic part of the cylinder due to the increasingly unequal flux distribution as the cylinder moves from its center position. This reaction force determines the maximum linear range of the cylinder, which range may be varied by adjusting the current in the middle transformer coil 8 by means of rheostat R or the like.

The other of the two forces that increasingly resist and damp movement of cylinder 5 and thereby reduce hunting is provided within the end chambers 6. As the cylinder moves toward one of the end caps 3 the air pressure within the decreasing one of the chambers 6 is temporarily increased. The amount of this increase in pressure depends on the degree of obstruction to the outward flow of air that is provided by adjustable valve 21, and also depends on the speed of movement of cylinder 5.

In calibrating the level and plumbline indicating device, it is placed on a level platform, or, alternatively, on a platform at any desired angle to the horizontal, with the datum line of the device level, and any output or signal current that may be coming from the differential transformer is then turned out by longitudinal adjustment of one of the end coils, or by the appropriate honing and consequent minor adjustment of the lower surfaces of the frame 2.

The gas used in the gaseous bearing is preferably air, of a low pressure and a controlled temperature.

Figure 1:
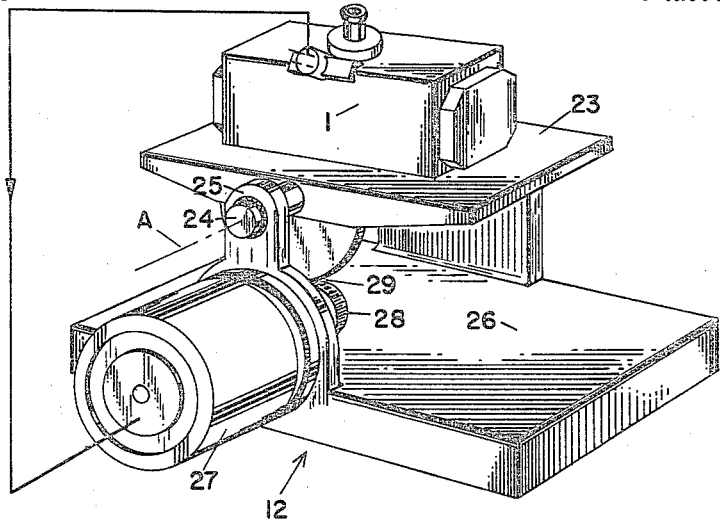
Figure 1 is a perspective view of one embodiment of the invention, incorporated in an automatic control system for stabilizing a platform that is pivoted on one axis.

In the embodiment of the invention shown in Figure 1, the device 1 is mounted on a platform 23 that is pivotally supported, on stabilized axis A, by means of trunnions 24 in spaced bearings 25 that are carried by support 26. A motor 27, which is preferably an electric motor, also mounted on support 26, has a shaft on which gear 28 is fixed. On rotation of the motor, gear 28 drives segmental gear 29, thereby pivoting the platform 23 on its bearings 25. The motor is energized by current through its connection with terminals C and D (Figure 5).

Figure 6:
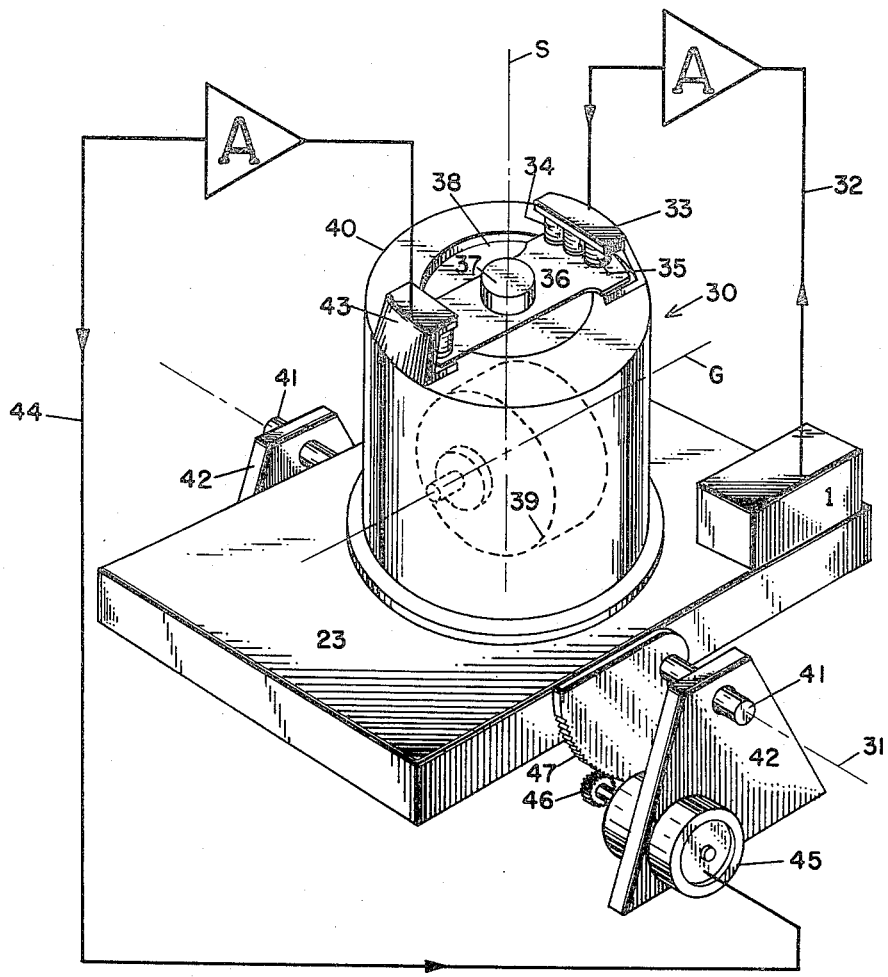
Figure 6 is a perspective view of another embodiment of the invention, wherein return of the platform to its predetermined position is effected by means of a stabilizing gyroscope.

In Figure 6, the level-indicating device 1 is shown as mounted on a single-axis platform 23, which also supports a stabilizing gyroscope 30, and which is used in the guidance and control of a missle or aircraft. In the operation of this platform and leveling system a small angular deviation of the platform from its level position about its stabilized axis 31 causes a voltage proportional to the deviation to be produced by the level-sensing device and transmitted through conductor 32. This voltage is amplified in amplifier or amplifiers A, and, optionally, may be added to or subtracted from another voltage. This additional voltage may be proportional to centrifugal force or any other force on the quasi pendulum which disturbs its accuracy in indicating a level datum line; and it may be in phase or 180 degrees out of phase, thereby shifting the apparent zero position of the level-indicating cylinder 5.

After the amplification and/or correction the output current, which has a polarity determined by the direction of the platform's deviation, energizes a torquer 33. This torquer is a small induction motor; it comprises a center coil, to which the variable current from 32 is supplied, two outside coils 34 and 35, which receive a constant current, and a copper plate 36 which is fixed to the neck 37 of the inner casing 38 of a gyroscope.

The purpose of the gyroscope is to aid in stabilization of the platform 23. It comprises: a rotor 39, rotated on spin axis G; an inner cage or can 38, in which the rotor is journalled; and an outer casing or housing 40, in which the can 38 is freely journalled, by means of an air bearing, on sensitive axis S of the gyroscope.

When a torque is applied by the torquer 33 which tends to rotate plate 36 and can 37—38 about axis S, against the inertia of the gyroscope, housing 40 and platform 23 to which the housing is fixed precess about axis 31, thus correcting the position of the platform, until the datum line of device 1 is again level.

A means may be provided in the device for compensating for the couple exerted on the platform about axis 31 due to the friction of the bearings by which trunnions 41 are journalled in supports 42. This frictional couple tends to precess the gyroscope and its can 38 about the sensitive axis S of the gyroscope, thus causing an error in the functioning of the device. This error is corrected by providing an inductive pickup 43, which on slight precession of can 37—38 and plate 36 causes a voltage to be supplied via an amplifier to electrical connection 44 and correction motor 45. Pickup 43 is similar to torquer 33 in construction, and comprises three coils and the part of plate 36 that is on the pickup side of neck 37. Motor 45 drives gears 46 and 47 and trunnions 41, thus correcting for the friction.

Figure 2:
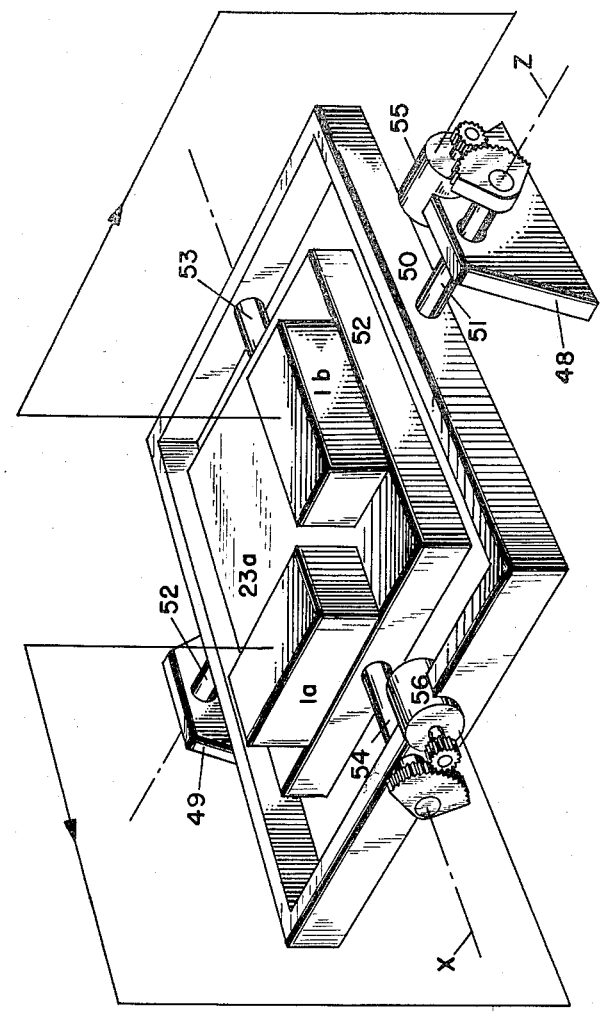
Figure 2 is a perspective view of another embodiment of the invention, incorporated in a control system for a platform that is stabilized about two axes.

In the embodiment of the invention shown in Figure 2, two identical level-sensitive devices 1a and 1b are shown as mounted on a platform 23a that is pivotally mounted, by means of gimbals, on two axes X and Z in the nose portion of a guided missile. Axis Z is fixed to and moves with supports 48 and 49, which are fixed to the body, hull or fuselage of a vehicle.

The platform's gimbals comprise frame or ring 50, that is pivoted by means of trunnions 51 and 52 in supports 48 and 49, and inner frame 52, that is pivoted by means of trunnions 53 and 54 on frame 50. Level-sensitive device 1b controls the attitude of platform 23a relative to axis Z, by energization of correction motor 55 on departure of the platform from the desired attitude about axis Z; and device 1a likewise maintains the desired attitude of the platform about axis X, by energization of correction motor 56.

The invention comprehends various obvious changes in the specific embodiments herein illustrated. For instance, it is obvious that for any part or all of the disclosed electrical apparatus there may be substituted equivalent hydraulic structure.

The following invention is claimed:

1. An automatic control system for maintaining a movable element in a predetermined position comprising: electromotive means for returning said movable element to its predetermined position after deviation therefrom; a device for indicating said deviation supported by the movable element and having a datum line that is level in the predetermined position of said element, comprising a frame, a member supported by the frame for movement relative to the frame on departure of said datum line from a level position, said member and frame having a clearance therebetween, means for supplying compressed gas to said clearance for forming a gaseous bearing for said member, and means for producing an electrical signal on movement of said member, said last-mentioned means comprising an electrical coil and a magnetic core that moves therein on movement of said member for producing and transmitting an electrical current, the reaction force produced on said magnetic core due to its movement serving to damp the movement of said member and to reduce hunting of the control system; and means electrically connecting said signal producing means to said electromotive means for operating said electromotive means on change of said movable element from its predetermined position.

2. An automatic control system for maintaining a movable element in a predetermined position comprising: motive means for returning said movable element to its predetermined position after deviation therefrom; a level sensing device, supported by the movable element and having a datum line that is level in the predetermined position of said element, comprising a frame, a member supported by the frame for movement relative to the frame on deviation of said datum line from a level position, said member and frame having a clearance therebetween that extends to the ends of said member, said frame comprising wall means which together with end surfaces of said movable member define chambers, each chamber being of decreasing size when said member moves toward it and at all times being in communication with said clearance, means for supplying compressed air to said clearance, and means for producing a signal on movement of said member, said chambers and end surfaces serving to damp the movement of said member and to reduce hunting of the control system; and means, controlled by said signal, for connecting said signal producing means to said motive means and thereby setting in operation said motive means on departure of said movable element from its predetermined position.

3. An automatic control system for maintaining a movable element in a predetermined position comprising: motive means for returning said movable element to its predetermined position after deviation therefrom; an indicating device, connected to the movable element, for producing a signal when said element departs from said position, said indicating device having a datum line that is level in the predetermined position of said element and comprising a frame, a member supported by the frame for movement relative to the frame on departure of said datum line from a level position, said member and frame having a clearance therebetween, means for supplying compressed gas to said clearance for forming a gaseous bearing for said member, said frame comprising wall means which together with end surfaces of said movable member define chambers, each chamber decreasing in size when said member moves toward it and at all times being in communication with said clearance, said chambers serving to damp the movement of said member and to reduce hunting of the control system, means for transmitting said signal to said motive means and thereby setting in operation said motive means on deviation of said movable element from its predetermined position.

4. A control system as set forth in claim 3 in which said indicating device comprises a coil, means for supplying electric current to said coil, and a second coil which supplies current to said signal transmitting means.

5. A control system as set forth in claim 3 in which said indicating device comprises magnetic material on said member, three coils spaced longitudinally relative to the line of movement of said member, and means for supplying electric current to the middle coil.

6. An automatic control apparatus as set forth in claim 3 in which said signal transmitting means comprises means for amplifying said signal.

7. A control apparatus as set forth in claim 3 in which said signal and motive means are electrical, and in which said motive means comprises a gyroscope that is supported by said movable element and means influenced by said signal for applying a torque on the gyroscope about its sensitive axis, thereby precessing said gyroscope and returning the movable element to its predetermined position.

8. A control apparatus as set forth in claim 7 in which said torque-applying means comprises an electrical coil, and a member of electrically conductive material that is moved by current in the coil, said member being connected to said gyroscope.

9. A control apparatus according to claim 8 in which said movable element is stabilized along a second axis that is normal to a plane comprising said sensitive axis, which apparatus further comprises: a support; bearings between said support and element, centered on said second axis, the friction of said bearings tending to cause accuracy-disturbing precession of said gyroscope about said sensitive axis, means for supplying current on precession of said gyroscope about said sensitive axis, a motor for turning said element about said second axis, and means connecting said current supplying means to said motor.

10. A control apparatus according to claim 9, in which said last mentioned means comprises an amplifier.

11. An automatic control apparatus for maintaining a movable platform in a predetermined position and stabilized along a plurality of axes comprising: a plurality of electric motors each connected to said platform for pivoting the platform about one of said axes; a device for indicating the deviation of the platform relative to each of said axes, each device being supported by the movable platform and having a datum line that intersects a plane that comprehends one of said axes, said datum line being level in the predetermined position of the platform relative to said one of the axes, each of said devices comprising a frame, a member supported by the frame for movement relative to the frame on departure of said datum line from a level position, said member and frame having a clearance therebetween that extends to the ends of said member, said frame comprising wall means which together with end surfaces of said movable member define chambers, each chamber being of decreasing size when said member moves toward it and at all times in communication with said clearance, means for supplying compressed gas to said clearance for forming a gaseous bearing for said member, and means for producing a signal on movement of said member, said chambers and end surfaces serving to damp the movement of the respective member, and, together with the chambers and end surfaces of a second one of the deviation-indicating devices, to reduce hunting of the control apparatus; and means for connecting said signal producing means of each of said devices to one of said motors.

References Cited in the file of this patent

UNITED STATES PATENTS

| | | |
|---|---|---|
| 2,158,048 | Braddon | May 9, 1939 |
| 2,440,189 | Zworykin | Apr. 20, 1948 |
| 2,484,022 | Esval | Oct. 11, 1949 |
| 2,591,921 | Cosgriff et al. | Apr. 8, 1952 |
| 2,790,119 | Konet et al. | Apr. 23, 1957 |
| 2,834,215 | Deer | May 13, 1958 |
| 2,852,942 | Gerard | Sept. 23, 1958 |